US008340875B1

(12) United States Patent
Shatters et al.

(10) Patent No.: US 8,340,875 B1
(45) Date of Patent: Dec. 25, 2012

(54) LIFT SYSTEM IMPLEMENTING VELOCITY-BASED FEEDFORWARD CONTROL

(75) Inventors: Aaron R. Shatters, Montgomery, IL (US); Steven C. Budde, Dunlap, IL (US); John T. Reedy, Peoria, IL (US); Robert E. Stone, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 13/162,280

(22) Filed: Jun. 16, 2011

(51) Int. Cl.
*B60P 1/50* (2006.01)

(52) U.S. Cl. ........................................................ 701/50

(58) Field of Classification Search ..................... 701/50
See application file for complete search history.

(56) References Cited

U.S. PATENT DOCUMENTS 4,332,517 A * 6/1982 Igarashi et al. ................. 701/50
5,442,868 A * 8/1995 Ahn ................................ 37/348
5,768,810 A * 6/1998 Ahn ................................ 37/348
5,782,018 A * 7/1998 Tozawa et al. .................. 37/348
5,826,666 A * 10/1998 Tozawa et al. .................... 172/7
6,098,322 A * 8/2000 Tozawa et al. .................. 37/414
6,115,660 A * 9/2000 Berger et al. ................... 701/50
6,233,511 B1 * 5/2001 Berger et al. ................... 701/50
6,609,315 B1 * 8/2003 Hendron et al. ................ 37/348
6,763,619 B2 * 7/2004 Hendron et al. ................ 37/348
7,530,185 B2 5/2009 Trifunovic
7,748,147 B2 * 7/2010 Schoenmaker et al. ........ 37/348
7,752,778 B2 * 7/2010 Schoenmaker et al. ........ 37/348
7,752,779 B2 * 7/2010 Schoenmaker et al. ........ 37/348
7,797,860 B2 * 9/2010 Schoenmaker et al. ........ 37/348
2010/0131158 A1 * 5/2010 Saito ............................... 701/50
2010/0254793 A1 * 10/2010 Trifunovic .................... 414/700

FOREIGN PATENT DOCUMENTS

JP 05070086 A * 3/1993
JP 10245866 A * 9/1998
JP 2002167794 A * 6/2002

OTHER PUBLICATIONS

U.S. Patent Application of Aaron R. Shatters et al. entitled "System Implementing Parallel Lift for Range of Angles" filed on Jun. 16, 2011.
U.S. Appl. No. 13/080,421, filed Apr. 5, 2011 entitled "Hydraulic System Having Fixable Multi-Actuator Relationship".

* cited by examiner

*Primary Examiner* — Shelley Chen
(74) *Attorney, Agent, or Firm* — Finnegan, Henderson, Farabow, Garrett & Dunner LLP

(57) ABSTRACT

A hydraulic system for lifting a work tool of a mobile machine is disclosed. The hydraulic system may have a pump, a lift actuator, a lift valve arrangement, and a lift sensor configured to generate a first signal indicative of an actual lift velocity. The hydraulic system may also have a tilt actuator, a tilt valve arrangement, and at least one operator interface device movable to generate a second signal indicative of a desired lift velocity and a third signal indicative of desired tilt velocity. The hydraulic system may further have a controller configured to command the lift valve arrangement to meter pressurized based on the second signal, command the tilt valve arrangement to meter pressurized fluid based on the third signal, and command the tilt valve arrangement to meter pressurized fluid and maintain a desired tilt angle of the work tool during lifting based selectively on the first and second signals.

37 Claims, 3 Drawing Sheets

LIFT SYSTEM IMPLEMENTING VELOCITY-BASED FEEDFORWARD CONTROL

TECHNICAL FIELD

The present disclosure relates generally to a lift system, and more particularly, to a parallel lift hydraulic system implementing velocity-based feedforward control.

BACKGROUND

Machines such as wheel loaders, excavators, dozers, motor graders, and other types of heavy equipment use multiple actuators supplied with hydraulic fluid from one or more pumps on the machine to accomplish a variety of tasks. These actuators are typically velocity controlled based on, among other things, an actuation position of an operator interface device. For example, when the operator of a wheel loader pulls a joystick controller rearward or pushes the joystick controller forward, one or more lift cylinders mounted on the wheel loader either extend to lift a work tool of the machine away from a ground surface or retract to lower the work tool back toward the ground surface at speeds related to the fore/aft displacement positions of the joystick controller. Similarly, when the operator pushes the same or another joystick controller to the left or right, tilt cylinders mounted on the wheel loader either extend to dump the work tool downward toward the ground surface or retract to rack the work tool backward away from the work surface at speeds related to the left/right displacement positions of the joystick controller.

In some machine configurations, when a work tool is lifted away from or lowered toward the ground surface, a tilt angle of the work tool relative to the ground surface naturally changes (e.g., the work tool may rack backward toward a cab of the machine during lifting, and dump downward toward the ground surface during lowering) due to mechanical linkage connected to the work tool, even though tilting had not been requested by the operator. In this situation, it may be possible for material within the work tool to spill over an edge of the work tool, in some cases onto the machine and/or operator of the machine. Historically, the operator of the machine was responsible for simultaneously adjusting movement of the tilt cylinder during lifting to ensure that the tilt angle of the work tool remained at a desired angle (i.e., to counteract the naturally occurring tilt of the work tool caused by lifting). This dual-control manual procedure, however, can be difficult to control and error prone.

One attempt to automatically reduce the likelihood of material spilling from a machine's work tool during lifting is disclosed in U.S. Pat. No. 7,530,185 that issued to Trifunovic on May 12, 2009 (the '185 patent). In particular, the '185 patent describes an electronic parallel lift system for a backhoe loader. The electronic parallel lift system includes a controller that causes an angle of the backhoe's tool to be automatically adjusted based on measurement of the tool's angle relative to the backhoe's frame, regardless of any particular mechanical relationship between supporting tool linkage, the backhoe's boom, and the tool. The controller uses at least one sensor to detect the angle of the tool relative to the vehicle frame, and then responsively commands a tool actuator to adjust the tool position as a function of the measured angle during boom movement.

SUMMARY

In one aspect, the present disclosure is directed to a hydraulic system. The hydraulic system may include a pump configured to pressurize fluid, a lift actuator, a lift valve arrangement configured to meter pressurized fluid from the pump into the lift actuator to lift a work tool, and a lift sensor associated with the lift actuator and configured to generate a first signal indicative of an actual lift velocity of the work tool. The hydraulic system may also include a tilt actuator, a tilt valve arrangement configured to meter pressurized fluid from the pump into the tilt actuator to tilt the work tool, and at least one operator interface device movable by an operator to generate a second signal indicative of a desired lift velocity of the work tool and a third signal indicative of desired tilt velocity of the work tool. The hydraulic system may also include a controller in communication with the lift valve arrangement, the lift sensor, the tilt valve arrangement, and the at least one operator interface device. The controller may be configured to command the lift valve arrangement to meter pressurized fluid into the lift actuator based on the second signal, command the tilt valve arrangement to meter pressurized fluid into the tilt actuator based on the third signal, and command the tilt valve arrangement to meter pressurized fluid into the tilt actuator and maintain a desired tilt angle of the work tool during lifting based selectively on the first and second signals.

In another aspect, the present disclosure is directed to a method of operating a machine. The method may include receiving operator input indicative of a desired lift velocity of a work tool and a desired tilt velocity of the work tool, pressurizing fluid, metering pressurized fluid into a lift actuator based on the desired lift velocity, and sensing an actual lift velocity of the work tool. The method may also include metering pressurized fluid into a tilt actuator based on the desired tilt velocity, and metering pressurized fluid into the tilt actuator to maintain a desired tilt angle of the work tool during lifting based selectively on the desired lift velocity and the actual lift velocity of the work tool.

DETAILED DESCRIPTION

Figure 1:
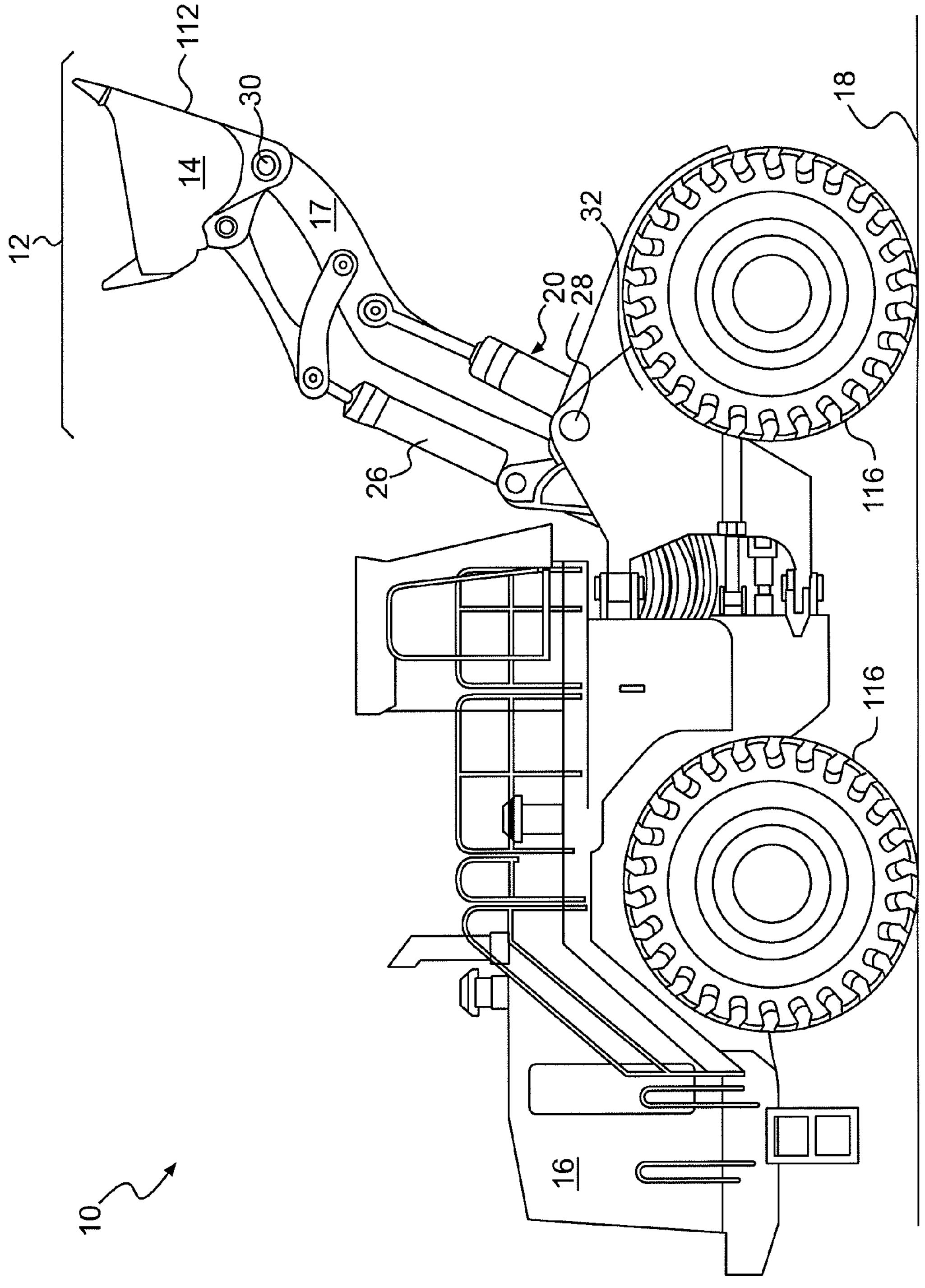
FIG. 1 is a side-view diagrammatic illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be a material moving machine such as the loader depicted in FIG. 1. Alternatively, machine 10 could embody an excavator, a dozer, a backhoe, a motor grader, or another similar machine. Machine 10 may include, among other things, a linkage system 12 configured to move a work tool 14, and a prime mover 16 that provides power to linkage system 12.

Linkage system 12 may include structure acted on by fluid actuators to move work tool 14. Specifically, linkage system 12 may include a boom (i.e., a lifting member) 17 that is vertically pivotable about a horizontal axis 28 relative to a ground surface 18 by a pair of adjacent, double-acting, hydraulic cylinders 20 (only one shown in FIG. 1). Linkage system 12 may also include a single, double-acting, hydraulic cylinder 26 connected to tilt work tool 14 relative to boom 17 in a vertical direction about a horizontal axis 30. Boom 17 may be pivotably connected at one end to a body 32 of machine 10, while work tool 14 may be pivotably connected to an opposing end of boom 17. It should be noted that alternative linkage configurations may also be possible.

Numerous different work tools 14 may be attachable to a single machine 10 and controlled to perform a particular task. For example, work tool 14 could embody a bucket (shown in FIG. 1), a fork arrangement, a blade, a shovel, a ripper, a dump bed, a broom, a snow blower, a propelling device, a cutting device, a grasping device, or another task-performing device known in the art. Although connected in the embodiment of FIG. 1 to lift and tilt relative to machine 10, work tool 14 may alternatively or additionally pivot, rotate, slide, swing, or move in any other appropriate manner.

Prime mover 16 may embody an engine such as, for example, a diesel engine, a gasoline engine, a gaseous fuel-powered engine, or another type of combustion engine known in the art that is supported by body 32 of machine 10 and operable to power the movements of machine 10 and work tool 14. It is contemplated that prime mover may alternatively embody a non-combustion source of power, if desired, such as a fuel cell, a power storage device (e.g., a battery), or another source known in the art. Prime mover 16 may produce a mechanical or electrical power output that may then be converted to hydraulic power for moving hydraulic cylinders 20 and 26.

Figure 2:
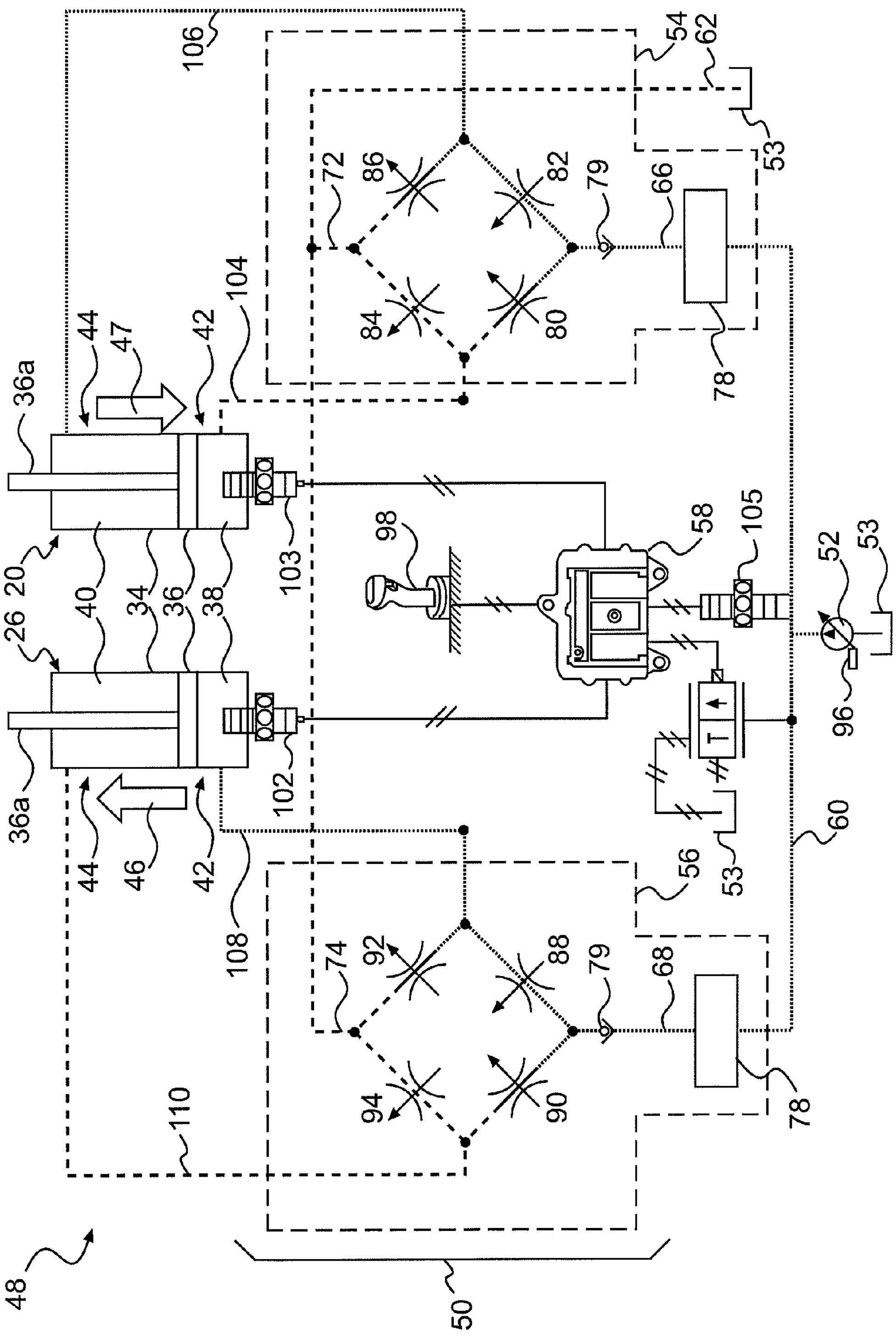
FIG. 2 is a schematic illustration of an exemplary disclosed hydraulic system that may be used in conjunction with the machine of FIG. 1.

For purposes of simplicity, FIG. 2 illustrates the composition and connections of only hydraulic cylinder 26 and one of hydraulic cylinders 20. It should be noted, however, that machine 10 may include other hydraulic actuators of similar composition connected to move the same or other structural members of linkage system 12 in a similar manner, if desired.

As shown in FIG. 2, each of hydraulic cylinders 20 and 26 may include a tube 34 and a piston assembly 36 arranged within tube 34 to form a first chamber 38 and a second chamber 40. In one example, a rod portion 36*a* of piston assembly 36 may extend through an end of second chamber 40. As such, second chamber 40 may be associated with a rod-end 44 of its respective cylinder, while first chamber 38 may be associated with an opposing head-end 42 of its respective cylinder.

First and second chambers 38, 40 may each be selectively supplied with pressurized fluid and drained of the pressurized fluid to cause piston assembly 36 to displace within tube 34, thereby changing an effective length of hydraulic cylinders 20, 26 and moving work tool 14 (referring to FIG. 1). A flow rate of fluid into and out of first and second chambers 38, 40 may relate to a velocity of hydraulic cylinders 20, 26 and work took 14, while a pressure differential between first and second chambers 38, 40 may relate to a force imparted by hydraulic cylinders 20, 26 on work tool 14. An expansion (represented by an arrow 46) and a retraction (represented by an arrow 47) of hydraulic cylinders 20, 26 may function to assist in moving work tool 14 in different manners (e.g., lifting and tilting work tool 14, respectively).

To help regulate filling and draining of first and second chambers 38, 40, machine 10 may include a hydraulic control system 48 having a plurality of interconnecting and cooperating fluid components. Hydraulic control system 48 may include, among other things, a valve stack 50 at least partially forming a circuit between hydraulic cylinders 20, 26, an engine-driven pump 52, and a tank 53. Valve stack 50 may include a lift valve arrangement 54, a tilt valve arrangement 56, and, in some embodiments, one or more auxiliary valve arrangements (not shown) that are fluidly connected to receive and discharge pressurized fluid in parallel fashion. In one example, valve arrangements 54, 56 may include separate bodies bolted to each other to form valve stack 50. In another embodiment, each of valve arrangements 54, 56 may be stand-alone arrangements, connected to each other only by way of external fluid conduits (not shown). It is contemplated that a greater number, a lesser number, or a different configuration of valve arrangements may be included within valve stack 50, if desired. For example, a swing valve arrangement (not shown) configured to control a swinging motion of linkage system 12, one or more travel valve arrangements, and other suitable valve arrangements may be included within valve stack 50. Hydraulic control system 48 may further include a controller 58 in communication with prime mover 16 and with valve arrangements 54, 56 to control corresponding movements of hydraulic cylinders 20, 26.

Each of lift and tilt valve arrangements 54, 56 may regulate the motion of their associated fluid actuators. Specifically, lift valve arrangement 54 may have elements movable to simultaneously control the motions of both of hydraulic cylinders 20 and thereby lift boom 17 relative to ground surface 18. Likewise, tilt valve arrangement 56 may have elements movable to control the motion of hydraulic cylinder 26 and thereby tilt work tool 14 relative to boom 17.

Valve arrangements 54, 56 may be connected to regulate separate flows of pressurized fluid to and from hydraulic cylinders 20, 26 via common passages. Specifically, valve arrangements 54, 56 may be connected to pump 52 by way of a common supply passage 60, and to tank 53 by way of a common drain passage 62. Lift and tilt valve arrangements 54, 56 may be connected in parallel to common supply passage 60 by way of individual fluid passages 66 and 68, respectively, and in parallel to common drain passage 62 by way of individual fluid passages 72 and 74, respectively. A pressure compensating valve 78 and/or a check valve 79 may be disposed within each of fluid passages 66, 68 to provide a unidirectional supply of fluid having a substantially constant flow to valve arrangements 54, 56. Pressure compensating valves 78 may be pre- (shown in FIG. 2) or post-compensating (not shown) valves movable, in response to a differential pressure, between a flow passing position and a flow blocking position such that a substantially constant flow of fluid is provided to valve arrangements 54 and 56, even when a pressure of the fluid directed to pressure compensating valves 78 varies. It is contemplated that, in some applications, pressure compensating valves 78 and/or check valves 79 may be omitted, if desired.

Each of lift and tilt valve arrangements 54, 56 may be substantially identical and include four independent metering valves (IMVs). Of the four IMVs, two may be generally associated with fluid supply functions, while two may be generally associated with drain functions. For example, lift valve arrangement 54 may include a head-end supply valve 80, a rod-end supply valve 82, a head-end drain valve 84, and a rod-end drain valve 86. Similarly, tilt valve arrangement 56 may include a head-end supply valve 88, a rod-end supply valve 90, a head-end drain valve 92, and a rod-end drain valve 94.

Head-end supply valve 80 may be disposed between fluid passage 66 and a fluid passage 104 that leads to first chamber 38 of hydraulic cylinder 20, and be configured to regulate a flow rate of pressurized fluid into first chamber 38 in response to a flow command from controller 58. Head-end supply valve 80 may include a variable-position, spring-biased valve element, for example a poppet or spool element, that is solenoid actuated and configured to move to any position between a first end-position at which fluid is allowed to flow into first chamber 38, and a second end-position at which fluid flow is blocked from first chamber 38. It is contemplated that head-end supply valve 80 may also be configured to allow fluid from first chamber 38 to flow through head-end supply valve 80 during a regeneration event when a pressure within first chamber 38 exceeds a pressure of pump 52 and/or a pressure of the chamber receiving the regenerated fluid. It is further contemplated that head-end supply valve 80 may include additional or different elements than described above such as, for example, a fixed-position valve element or any other valve element known in the art. It is also contemplated that head-end supply valve 80 may alternatively be hydraulically actuated, mechanically actuated, pneumatically actuated, or actuated in another suitable manner.

Rod-end supply valve 82 may be disposed between fluid passage 66 and a fluid passage 106 leading to second chamber 40 of hydraulic cylinder 20, and be configured to regulate a flow rate of pressurized fluid into second chamber 40 in response to a flow command from controller 58. Rod-end supply valve 82 may include a variable-position, spring-biased valve element, for example a poppet or spool element, that is solenoid actuated and configured to move to any position between a first end-position at which fluid is allowed to flow into second chamber 40, and a second end-position at which fluid is blocked from second chamber 40. It is contemplated that rod-end supply valve 82 may also be configured to allow fluid from second chamber 40 to flow through rod-end supply valve 82 during a regeneration event when a pressure within second chamber 40 exceeds a pressure of pump 52 and/or a pressure of the chamber receiving the regenerated fluid. It is further contemplated that rod-end supply valve 82 may include additional or different valve elements such as, for example, a fixed-position valve element or any other valve element known in the art. It is also contemplated that rod-end supply valve 82 may alternatively be hydraulically actuated, mechanically actuated, pneumatically actuated, or actuated in another suitable manner.

Head-end drain valve 84 may be disposed between fluid passage 104 and fluid passage 72, and be configured to regulate a flow rate of pressurized fluid from first chamber 38 of hydraulic cylinder 20 to tank 53 in response to a flow command from controller 58. Head-end drain valve 84 may include a variable-position, spring-biased valve element, for example a poppet or spool element, that is solenoid actuated and configured to move to any position between a first end-position at which fluid is allowed to flow from first chamber 38, and a second end-position at which fluid is blocked from flowing from first chamber 38. It is contemplated that head-end drain valve 84 may include additional or different valve elements such as, for example, a fixed-position valve element or any other valve element known in the art. It is also contemplated that head-end drain valve 84 may alternatively be hydraulically actuated, mechanically actuated, pneumatically actuated, or actuated in another suitable manner.

Rod-end drain valve 86 may be disposed between fluid passage 106 and fluid passage 72, and be configured to regulate a flow rate of pressurized fluid from second chamber 40 of hydraulic cylinder 20 to tank 53 in response to a flow command from controller 58. Rod-end drain valve 86 may include a variable-position, spring-biased valve element, for example a poppet or spool element, that is solenoid actuated and configured to move to any position between a first end-position at which fluid is allowed to flow from second chamber 40, and a second end-position at which fluid is blocked from flowing from second chamber 40. It is contemplated that rod-end drain valve 86 may include additional or different valve elements such as, for example, a fixed-position valve element or any other valve element known in the art. It is also contemplated that rod-end drain valve 86 may alternatively be hydraulically actuated, mechanically actuated, pneumatically actuated, or actuated in another suitable manner.

Head-end supply valve 88 may be disposed between fluid passage 68 and a fluid passage 108 that leads to first chamber 38 of hydraulic cylinder 26, and be configured to regulate a flow rate of pressurized fluid into first chamber 38 in response to a flow command from controller 58. Head-end supply valve 88 may include a variable-position, spring-biased valve element, for example a poppet or spool element, that is solenoid actuated and configured to move to any position between a first end-position at which fluid is allowed to flow into first chamber 38, and a second end-position at which fluid flow is blocked from first chamber 38. It is contemplated that head-end supply valve 88 may be also configured to allow fluid from first chamber 38 to flow through head-end supply valve 88 during a regeneration event when a pressure within first chamber 38 exceeds a pressure of pump 52 and/or a pressure of the chamber receiving the regenerated fluid. It is further contemplated that head-end supply valve 88 may include additional or different elements such as, for example, a fixed-position valve element or any other valve element known in the art. It is also contemplated that head-end supply valve 88 may alternatively be hydraulically actuated, mechanically actuated, pneumatically actuated, or actuated in another suitable manner.

Rod-end supply valve 90 may be disposed between fluid passage 68 and a fluid passage 110 that leads to second chamber 40 of hydraulic cylinder 26, and be configured to regulate a flow rate of pressurized fluid into second chamber 40 in response to a flow command from controller 58. Specifically, rod-end supply valve 90 may include a variable-position, spring-biased valve element, for example a poppet or spool element, that is solenoid actuated and configured to move to any position between a first end-position, at which fluid is allowed to flow into second chamber 40, and a second end-position, at which fluid is blocked from second chamber 40. It is contemplated that rod-end supply valve 90 may also be configured to allow fluid from second chamber 40 to flow through rod-end supply valve 90 during a regeneration event when a pressure within second chamber 40 exceeds a pressure of pump 52 and/or a pressure of the chamber receiving the regenerated fluid. It is further contemplated that rod-end supply valve 90 may include additional or different valve elements such as, for example, a fixed-position valve element or any other valve element known in the art. It is also contemplated that rod-end supply valve 90 may alternatively be hydraulically actuated, mechanically actuated, pneumatically actuated, or actuated in another suitable manner.

Head-end drain valve 92 may be disposed between fluid passage 108 and fluid passage 74, and be configured to regulate a flow rate of pressurized fluid from first chamber 38 of hydraulic cylinder 26 to tank 53 in response to a flow command from controller 58. Specifically, head-end drain valve 92 may include a variable-position, spring-biased valve element, for example a poppet or spool element, that is solenoid actuated and configured to move to any position between a first end-position at which fluid is allowed to flow from first chamber 38, and a second end-position at which fluid is blocked from flowing from first chamber 38. It is contemplated that head-end drain valve 92 may include additional or different valve elements such as, for example, a fixed-position valve element or any other valve element known in the art. It is also contemplated that head-end drain valve 92 may alternatively be hydraulically actuated, mechanically actuated, pneumatically actuated, or actuated in another suitable manner.

Rod-end drain valve 94 may be disposed between fluid passage 110 and fluid passage 74, and be configured to regulate a flow rate of pressurized fluid from second chamber 40 of hydraulic cylinder 26 to tank 53 in response to a flow command from controller 58. Rod-end drain valve 94 may include a variable-position, spring-biased valve element, for example a poppet or spool element, that is solenoid actuated and configured to move to any position between a first end-position at which fluid is allowed to flow from second chamber 40, and a second end-position at which fluid is blocked from flowing from second chamber 40. It is contemplated that rod-end drain valve 94 may include additional or different valve element such as, for example, a fixed-position valve element or any other valve elements known in the art. It is also contemplated that rod-end drain valve 94 may alternatively be hydraulically actuated, mechanically actuated, pneumatically actuated, or actuated in another suitable manner.

Pump 52 may have variable displacement and be load-sense controlled to draw fluid from tank 53 and discharge the fluid at a specified elevated pressure to valve arrangements 54, 56. That is, pump 52 may include a stroke-adjusting mechanism 96, for example a swashplate or spill valve, a position of which is hydro-mechanically adjusted based on a sensed load of hydraulic control system 48 to thereby vary an output (e.g., a discharge rate) of pump 52. The displacement of pump 52 may be adjusted from a zero displacement position at which substantially no fluid is discharged from pump 52, to a maximum displacement position at which fluid is discharged from pump 52 at a maximum rate. In one embodiment, a load-sense passage (not shown) may direct a pressure signal to stroke-adjusting mechanism 96 and, based on a value of that signal (i.e., based on a pressure of signal fluid within the passage), the position of stroke-adjusting mechanism 96 may change to either increase or decrease the output of pump 52 and thereby maintain the specified pressure. Pump 52 may be drivably connected to prime mover 16 of machine 10 by, for example, a countershaft, a belt, or in another suitable manner. Alternatively, pump 52 may be indirectly connected to prime mover 16 via a torque converter, a gear box, an electrical circuit, or in any other manner known in the art.

Tank 53 may constitute a reservoir configured to hold a supply of fluid. The fluid may include, for example, a dedicated hydraulic oil, an engine lubrication oil, a transmission lubrication oil, or any other fluid known in the art. One or more hydraulic circuits within machine 10 may draw fluid from and return fluid to tank 53. It is also contemplated that hydraulic control system 48 may be connected to multiple separate fluid tanks, if desired.

Controller 58 may embody a single microprocessor or multiple microprocessors that include components for controlling valve arrangements 54, 56 based on, among other things, input from an operator of machine 10 and/or one or more sensed operational parameters. Numerous commercially available microprocessors can be configured to perform the functions of controller 58. It should be appreciated that controller 58 could readily be embodied in a general machine microprocessor capable of controlling numerous machine functions. Controller 58 may include a memory, a secondary storage device, a processor, and any other components for running an application. Various other circuits may be associated with controller 58 such as power supply circuitry, signal conditioning circuitry, solenoid driver circuitry, and other types of circuitry.

Controller 58 may receive operator input associated with a desired movement of machine 10 by way of one or more interface devices 98 that are located within an operator station of machine 10. Interface devices 98 may embody, for example, single or multi-axis joysticks, levers, or other known interface devices located proximate an onboard operator seat (if machine 10 is directly controlled by an onboard operator) or located within a remote station offboard machine 10. Each interface device 98 may be a proportional-type device that is movable through a range from a neutral position to a maximum displaced position to generate a corresponding displacement signal that is indicative of a desired velocity of work tool 14 caused by hydraulic cylinders 20, 26, for example desired lift and tilt velocities of work tool 14. The desired lift and tilt velocity signals may be generated independently or simultaneously by the same or different interface devices 98, and be directed to controller 58 for further processing.

In some embodiments, a mode button 99 or other similar activating component may be associated with interface devices 98 and utilized by the operator of machine 10 to initiate machine operation in a particular mode. For example, mode button 99 may be located on the same operator interface device 98 utilized to request particular lift and/or tilt velocities, and be selectively activated by the operator to implement a mode of operation that fixes a relationship between work tool lifting and tilting so as to alleviate tilt adjusting required by the operator during lifting. This fixed relationship mode of operation may be commonly known as parallel lift, and function to maintain a particular angle of work tool 14 relative to ground surface 18 during lifting without the operator being required to simultaneously correct the naturally occurring work tool tilt. The same or another button associated with interface devices 98 may be utilized by the operator to set the particular angle maintained during parallel lift. For example, the operator may move work tool 14 to a desired orientation, and then activate mode button 99 to indicate the current orientation is the desired orientation. Parallel lift will be described in more detail in the following section.

One or more maps relating the interface device signals, the corresponding desired work tool velocities, associated flow rates, valve element positions, system pressures, modes of operation, and/or other characteristics of hydraulic control system 48 may be stored in the memory of controller 58. Each of these maps may be in the form of tables, graphs, and/or equations. Controller 58 may be configured to allow the operator to directly modify these maps and/or to select specific maps from available relationship maps stored in the memory of controller 58 to affect actuation of hydraulic cylinders 20, 26. It is also contemplated that the maps may be automatically selected for use by controller 58 based on sensed or determined modes of machine operation, if desired.

Controller 58 may be configured to receive input from interface device 98 and to command operation of valve arrangements 54, 56 in response to the input and based on the relationship maps described above. Specifically, controller 58 may receive the interface device signals indicative of a desired work tool lift/tilt velocities and mode of operation, and reference the selected and/or modified relationship maps stored in the memory of controller 58 to determine desired flow rates for the appropriate supply and/or drain elements within valve arrangements 54, 56. The desired flow rates can then be commanded of the appropriate supply and drain elements to cause filling of particular chambers within hydraulic cylinders 20, 26 at rates that correspond with the desired work tool velocities in the selected operational mode.

Controller 58 may rely, at least in part, on information from one or more sensors during parallel lift. The information may include, for example, sensory information regarding the lift velocity and orientation of work tool 14 relative to ground surface 18. In the disclosed embodiment, the lift velocity information is provided by way of a velocity sensor 103 associated with hydraulic cylinders 20, while the orientation information is provided by way of a position sensor 102 associated with hydraulic cylinder 26. Sensors 102, 103 may each embody a magnetic pickup-type sensor associated with a magnet (not shown) embedded within the piston assembly 36 of the different hydraulic cylinders 20, 26. In this configuration, sensors 102, 103 may each be configured to detect an extension position of the corresponding hydraulic cylinder 20, 26 by monitoring the relative location of the magnet, and generate corresponding position signals directed to controller 58 for further processing. It is contemplated that sensors 102, 103 may alternatively embody other types of sensors such as, for example, magnetostrictive-type sensors associated with a wave guide (not shown) internal to hydraulic cylinders 20, 26, cable type sensors associated with cables (not shown) externally mounted to hydraulic cylinders 20, 26, internally- or externally-mounted optical sensors, rotary style sensors associated with joints pivotable by hydraulic cylinders 20, 26, or any other type of sensors known in the art. From the position signals generated by sensors 102, 103 and based on known geometry and/or kinematics of hydraulic cylinders 20, 26 and linkage system 12, controller 58 may be configured to calculate the lift velocity and orientation of work tool 14 relative to body 32 and/or ground surface 18. This information may then be utilized by controller 58 during parallel lift, as will be described in more detail below.

Controller 58 may also rely on pressure information during the control of valve arrangements 54, 56. The pressure of hydraulic control system 48 may be directly or indirectly measured by way of a pressure sensor 105. Pressure sensor 105 may embody any type of sensor configured to generate a signal indicative of a pressure of hydraulic control system 48. For example, pressure sensor 105 may be a strain gauge-type, capacitance-type, or piezo-type compression sensor configured to generate a signal proportional to a compression of an associated sensor element by fluid in communication with the sensor element. Signals generated by pressure sensor 105 may be directed to controller 58 for further processing.

Figure 3:
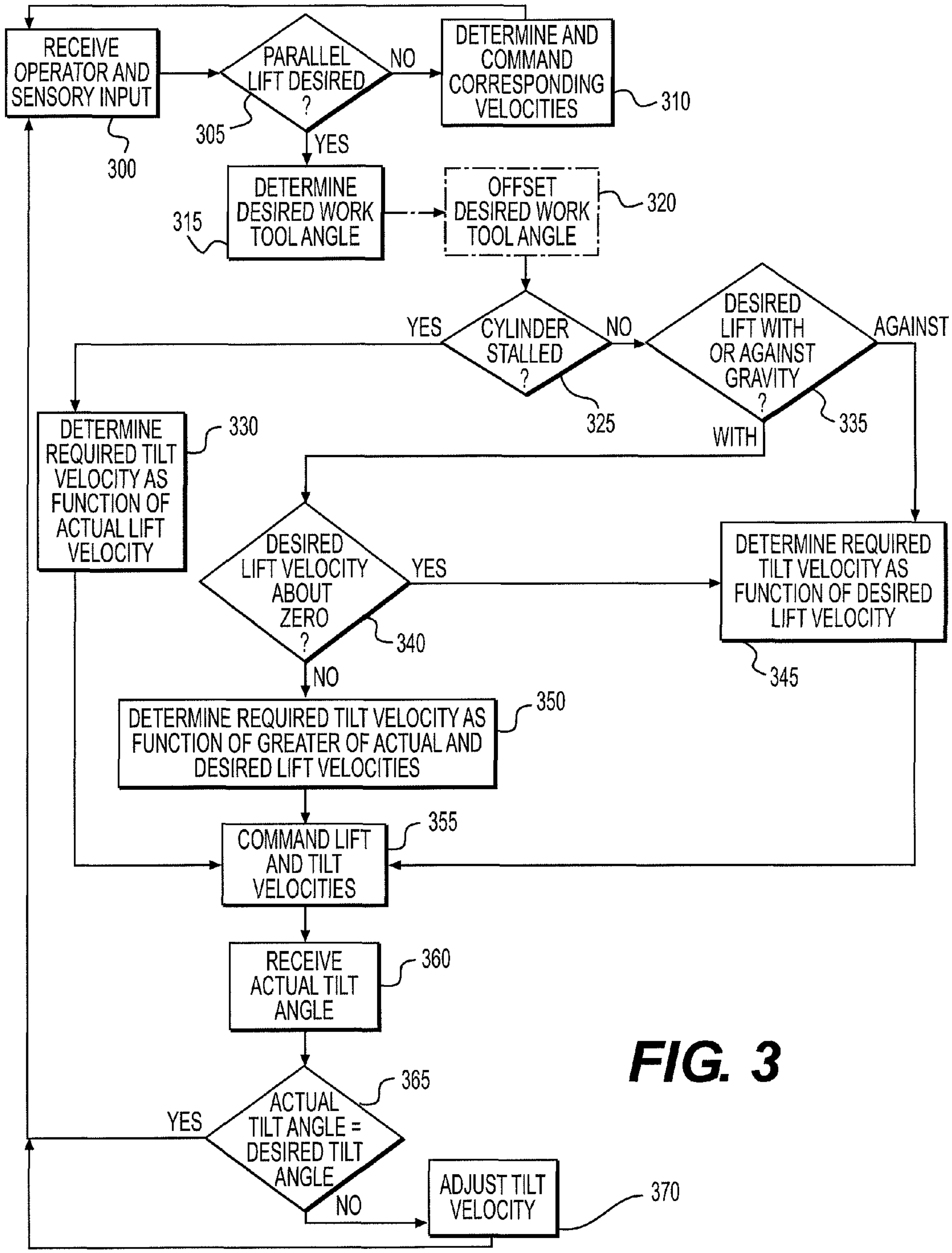
FIG. 3 is a flow chart illustrating an exemplary disclosed method performed by the hydraulic system of FIG. 2.

FIG. 3 illustrates an exemplary operation performed by controller 58 during parallel lift. FIG. 3 will be discussed in more detail in the following section to further illustrate the disclosed concepts.

INDUSTRIAL APPLICABILITY

The disclosed hydraulic control system may be applicable to any machine having a work tool where it is desirable to maintain a specific orientation of the work tool during lifting of the work tool. The disclosed hydraulic control system may be used to selectively implement a fixed relationship mode of operation, also known as parallel lift, that provides the ability to maintain the work tool orientation with little or no operator intervention. Operation of hydraulic control system 48 will now be explained.

During operation of machine 10, a machine operator may manipulate interface device 98 to request corresponding lifting and tilting movements of work tool 14. For example, the operator may move interface device 98 in the fore/aft direction to request lifting of work tool 14 downward (i.e., lowering) toward ground surface 18 with the force of gravity and upward away from ground surface 18 against the force of gravity, respectively. The operator may also move interface device 98 in the left/right direction to request a rearward tilting (i.e., racking) of work tool 14 and a forward tilting (i.e., dumping) of work tool 14, respectively. The displacement positions of interface device 98 in the fore/aft and left/right directions may be related to operator desired lift and tilt velocities of work tool 14. Interface device 98 may generate first and second velocity signals indicative of the operator desired lift and tilt velocities of work tool 14 during manipulation, and direct these velocity signals to controller 58 for further processing. In general, the first and second velocity signals may be positive when associated with upward lifting and racking, and negative when associated with lowering and dumping. The operator may choose also to implement parallel lift and/or to specify a desired work tool angle by way of mode button 99 located on interface device 98. A third signal indicative of the desire to activate parallel lift and/or indicative of the desired work tool angle to be maintained during lifting may be generated by mode button 99 and directed to controller 58 for further processing.

It is contemplated that implementation of parallel lift may be triggered and/or the desired work tool angle specified in a manner other than via mode button 99, if desired. For example, implementation of parallel lift may be automatically triggered any time during work tool lifting when a desired tilt velocity signal is non-existent (i.e., when the operator has not requested tilting of work tool 14) or when a desired tilt velocity that has been requested by the operator is less than a threshold amount (e.g., less than the tilt velocity required to maintain work tool 14 at the desired angle during lifting). In this example, a current angle of work tool 14 at the time that lifting is requested by the operator via interface device 98 may be the desired angle that is automatically maintained by controller 58 during parallel lift.

In another embodiment, parallel lift may be automatically triggered anytime work tool 14 is positioned within or enters a specified range of tilt angles during lifting. The specified range of tilt angles may be defined as a range of angles measured between a particular surface of work tool 14, for example a substantially flat bottom surface 112 of work tool 14 and a generally horizontal plane of machine 10 such as a plane 114 shown in FIG. 1 as passing through a center of machine traction devices 116. In the disclosed embodiment, the specified range of angles used to automatically trigger parallel lift may be about +/−20° to 30° between surface 112 and plane 114. In this embodiment, the angle of work tool 14 that should be maintained during parallel lift may be the angle of work tool 14 during lifting when it enters the specified range of angles or, alternatively the current angle of work tool 14 within the specified range of angles at the time that lifting is requested and parallel lift is initiated. It is contemplated that other ways of determining an operator's desire to implement parallel lift and the desired angle of work tool 14 may be utilized, if desired.

During operation of machine 10, controller 58 may receive operator input via interface device 98 (e.g., signals regarding the desired work tool velocities, mode activation, and/or a desired work tool angle), and position, velocity, and pressure information via sensors 102, 103, and 105 (Step 300). Based on the operator and sensory input, controller 58 may determine if parallel lift of work tool 14 is desired using any of the methods described above. When controller 58 determines that parallel lift is not desired by the operator of machine 10 (Step 305: No), controller 58 may determine and command flow rates corresponding to the operator input in a conventional manner that result in the operator desired work tool velocities (Step 310).

However, if at Step 305, controller 58 determines that parallel lift is desired by the operator (Step 305: Yes), controller 58 may then determine what desired angle of work tool 14 should be maintained during lifting (Step 315). As described above, the desired work tool angle may be manually defined by operator manipulation of mode button 99 (or in another manual manner) or, alternatively, automatically defined by the orientation of work tool 14 at the start of parallel lift (e.g. the orientation of work tool 14 within the range of angles specified for parallel lift).

In one embodiment, controller 58 may be configured to offset in a racking direction the desired angle of work tool 14 that should be maintained during parallel lift (Step 320). The tilt angle offset, in the disclosed embodiment, may be variable and change based on a lift or tilt amount implemented since initiating parallel lift (e.g., since capturing a desired angle to be maintained during parallel lift). For example when first initiating parallel lift, the tilt angle offset may be about zero, and linearly increased to about 1° in the racking direction as work tool 14 is lifted a certain amount (e.g., about 400 mm) and/or tilted by a particular angle. By offsetting the desired tilt angle of work tool 14 in the racking direction, errors associated with implementation of parallel lift may be accommodated without allowing work tool 14 to erroneously dump material. That is, it may be better to cause work tool 14 to rack slightly more than desired, than to allow work tool 14 to erroneously dump material, and the tilt angle offset may provide this functionality. Step 320 may be optional and omitted, if desired.

Controller 58 may determine the tilt velocity required to maintain work tool 14 at the desired tilt angle during lifting in at least three different ways. In particular, controller 58 may determine tilt velocity as a function of only the actual lift velocity of work tool 14 as received via sensor 103 (Step 330), as a function of the greater of the actual lift velocity and the desired lift velocity as received via interface device 98 (Step 350), or as a function of only the desired lift velocity (Step 345). Controller 58 may consider, among other things, a stalled condition of hydraulic cylinders 20 and a lift direction of work tool 14 imparted by hydraulic cylinders 20 when establishing which way to determine the required tilt velocity of work tool 14.

In particular, after completion of Step 315 and, in some embodiments also after completion of the optional Step 320, controller 58 may determine if cylinders 20 have stalled and selectively affect tilt velocity calculation based on the determination. One indication of stall may be associated with a discharge pressure of pump 52 (as detected by sensor 105) approaching a maximum system pressure. A velocity of cylinders 20 (as detected via sensor 102), alone or together with system pressure, may provide another indication of stall (e.g., when cylinders 20 have zero velocity but are being provided with fluid pressurized to the maximum pressure, cylinders 20 may be considered to have stalled). It is contemplated that other methods of determining stall may also be utilized, if desired. When controller 58 determines that cylinders 20 are experiencing stall (Step 325: Yes), control may proceed to Step 330 where controller 58 calculates the required tilt velocity for parallel lift utilizing the first option described above. The reason for utilizing only actual lift velocity in this situation to determine the required tilt velocity, is because a stalled condition of hydraulic cylinders 20 may result in a discrepancy between desired and actual lift velocities (i.e., desired lift velocity will be non-zero, but actual lift velocity may be about zero during cylinder stall), and accuracy in tilt control may only be possible through the use of the actual lift velocity. If stall is not detected (Step 325: No), control may proceed instead to Step 335, where lift direction may have an effect on tilt velocity calculation.

At Step 335, controller 58 may determine if the lift direction requested by the operator during parallel lift is with or against the force of gravity (Step 335). If the lift direction requested by the operator during parallel lift is upward away from ground surface 18 and against the force of gravity (as manifest in one example by a positive desired lift velocity signal or an aft-tilting movement of interface device 98), controller 58 may determine the corresponding tilt velocity required to maintain the desired angle of work tool 14 during lifting as a function of the desired lift velocity (i.e., control may continue to Step 345). If at Step 335, however, it is determined that the lift direction requested by the operator during parallel lift is downward toward ground surface 18 (as manifest in one example by a negative desired lift velocity signal or a forward-tilting movement of interface device 98), controller 58 may first determine a magnitude of the desired lift velocity before choosing which method to use in determining the corresponding required tilt velocity. Specifically, controller 58 may first determine if the desired lift velocity is about zero (i.e., within a threshold of zero), before determining to proceed to Step 345 or Step 350 (Step 340).

If, at Step 340, controller 58 determines that the desired lift velocity is about zero (Step 340: Yes), control may proceed to Step 345, where the corresponding required tilt velocity may be determined as a function of only the desired lift velocity. One reason why desired lift velocity alone may be used to determine the corresponding tilt velocity during parallel lift when the desired lift velocity is about zero, is because there may be situations in particular machine applications where significant delays in the actual lift velocity measurements performed by sensor 103/controller 58 and/or in the response of hydraulic cylinders 20 occur. In these situations, because of the time delays, it may be possible for the desired lift velocity, as provided by interface device 98, to be about zero, but actual lift velocity, as measures by sensor 103, to lag behind and be much greater. If the actual lift velocity were used in this situation to determine the subsequent tilt velocity of work tool 14, work tool 14 might be caused to tilt at a time when work tool 14 should no longer be lifting or tilting.

However, if at Step 340, controller 58 determines that the desired lift velocity is not about zero, controller 58 may instead determine the corresponding required tilt velocity as a function of the greater of the desired and actual lift velocities. One reason that the greater of the desired or actual lift velocities may be used during lifting movements with the force of gravity (as opposed to always using desired lift velocity), is because it may be possible for work tool 14 to actually move faster than the desired lift velocity when acted upon by the force of gravity (e.g., in an overrunning situation). In this situation, determining the required tilt velocity as a function of the desired lift velocity could result in an inaccurate tilt velocity (i.e., a velocity that is too slow) that causes work tool 14 to be incorrectly positioned at an undesired angle.

In any of Steps 330, 345, or 350 described above, the function used by controller 58 to determine the tilt velocity required to maintain the desired angle of work tool 14 during parallel lift may be a scaling function. In particular, controller 58 may be configured to scale down the appropriate lift velocity (actual or desired accordingly to stall condition, lift velocity magnitude, and lift direction) to determine the required tilt velocity used as a feedforward control term during parallel lifting of work tool 14. In one embodiment, the scaling factor used to scale down the lift velocity may be a fixed factor used regardless of the tilt direction, angle, or velocity. In another embodiment, the scaling factor may change and be dependent at least in part on the tilt direction, angle, and/or velocity of work tool 14. For example, when racking of work tool 14 during lifting is required to maintain the desired work tool angle during lifting, a first scaling factor may be utilized to determine the corresponding tilt velocity and, when dumping of work tool 14 during lifting is required, a second scaling factor different from the first scaling factor (e.g., smaller than the first scaling factor) may be utilized to determine the corresponding tilt velocity. The difference in scaling factors used during racking and dumping may help to accommodate internal differences in head- and rod-end cylinder geometry and/or the effects of gravity and other uncontrolled influences on the tilting velocity of work tool 14. It is contemplated that other scaling factor strategies may be used, if desired.

The specific scaling factor(s) used to determine the required tilt velocity may be machine, work tool, and/or linkage system dependent, and based on known kinematics. That is, for a given machine/tool/linkage configuration, the way that the orientation of a particular machine's work tool 14 naturally changes during lifting may be known. Accordingly, the lift-to-tilt scaling factor(s) may be calculated based on the known kinematics such that the orientation of work tool 14 remains about the same (i.e., at the operator desired angle) during parallel lifting of work tool 14. The scaling factor(s) may be provided to controller 58 in the form of factor values, equations, algorithms, and/or maps, which controller 58 may then utilize to determine the scaled tilt velocity for any given lift velocity. After scaling the lift velocity (actual or desired) to determine the required tilt velocity used as the feedforward control term during parallel lift, controller 58 may direct commands corresponding to the desired lift and tilt velocities to the corresponding lift and tilt valve arrangements 54, 56 to move hydraulic cylinders 20, 26 (Step 355).

Because of machine-to-machine variation, machine aging and wear, machine damage, and other factors over which controller 58 may have little influence, it may be possible for orientation errors greater than can be accommodated by the tilt offset to occur during parallel lift operations of machine 10. That is, it may be possible that the scaled tilt velocity may not always successfully maintain work tool 14 in the desired orientation during lifting. Accordingly, controller 58 may also utilize feedback from sensors 102, 103, in some embodiments, to account for and/or correct the errors. Specifically, controller 58 may receive the actual tilt angle of work tool 14 (i.e., receive indications of the actual tilt angle) from sensors 102 and/or 103 (Step 360), and continuously or selectively compare the actual tilt angle to the desired tilt angle and determine if the scaling factor is successfully maintaining work tool 14 at the desired tilt angle during operator-requested lifting (Step 365). If the scaling factor and associated tilt velocity are not successfully maintaining the desired work tool orientation during lifting (Step 350: No) (i.e., if the difference is greater than a threshold amount), controller 58 may be configured to selectively adjust the scaling factor and/or commanded tilt velocity accordingly (Step 370). Control may loop through Steps 365 and 370 until the orientation error has been sufficiently reduced. In some embodiments, controller 58 may also be configured to make incremental adjustments to the scaling factor over time that can be saved and utilized in future parallel lift operations each time the comparison of Step 365 is completed and errors are determined, to thereby improve future work tool orientation accuracies, if desired. After successful completion of Step 370, control may return to Step 300.

During parallel lift operations in some machine applications, because of particular configurations of linkage system 12, tilting of work tool 14 may need to transition between racking and dumping during lifting in a single direction in order to maintain the desired angle. That is, for a particular machine linkage configuration, as work tool 14 is lifting in one direction, controller 58 may determine that racking is first necessary to maintain a desired angle of work tool 14. After a period of lifting, however, as work tool 14 nears a particular point in an arc of motion, for example an apex, controller 58 may determine that dumping is subsequently required to maintain the desired angle during continued lifting. In this situation, as controller 58 transitions between racking and dumping control of work tool 14 during parallel lift (i.e., as the particular point is neared), controller 58 may be configured to command tilt valve arrangement 56 to stop metering fluid for a period of lift bounding the transition point (i.e., controller 58 may implement a deadband). This deadband may help to reduce instabilities in tilt control during the transition.

In one example, the deadband described above may be applicable other times not associated with the transition between racking and dumping of work tool 14. In particular, controller 58 may be configured to selectively command tilt valve arrangement 56 to stop metering fluid when an operator-initiated lift command leads to a very small tilt angle change. Although this generally occurs at the transition point between racking and dumping, this may also occur, for example, when lift has just been initiated and/or when lift is being commanded at a very slow rate.

In another example, controller 58 may initiate a deadband of allowable error instead of or in addition to the deadband described above. In particular, controller 58 may be configured to only adjust the velocity command directed to tilt valve arrangement 56 based on feedback from sensors 102, 103 when the error between desired and actual tilt angle becomes greater than a threshold amount. When this error is less than the threshold amount, controller 58 may only utilize feedforward control (i.e., control based on only scaled lift velocity). And, once the threshold amount of error has been exceeded, controller 58 may utilize both feedforward and feedback control until the amount of error is reduced to about zero. In some embodiment, the threshold amount of error may be variable and based on, for example, the sign of the feedforward control term (i.e., based on whether work tool 14 is dumping or racking).

In some applications, it may be possible for the hydraulic control system 48 of particular machines 10 to be flow-limited during parallel lift. That is, it may be possible for a demand for pressurized fluid to exceed a supply rate of pump 52. During positive parallel lifting (i.e. lifting away from ground surface 18 in the fixed relationship mode of operation), pressure compensating valves 78 may function to ratiometrically distribute (i.e., distribute based on flow areas of lift and tilt valve arrangements 54, 56) the limited flow of pressurized fluid from pump 52 to each of lift and tilt valve arrangements 54, 56 (i.e., pressure compensating valves 78 may function to restricted flow to each of lift and tilt valve arrangements in an amount based on pressure and a ratio of the flow areas). Accordingly, work tool 14 may be maintained at the desired angle during positive parallel lifting even when machine 10 is flow-limited, although lifting and tilting may both occur slower than normal. However, during negative parallel lifting (i.e., during lifting toward ground surface 18 with the force of gravity) when machine 10 is flow-limited, controller 58 may need to modify the velocity commands directed to lift and/or tilt valve arrangements 54, 56 to help ensure that work tool 14 is maintained at the desired angle with less than adequate fluid supply. Specifically, controller 58 may be configured to selectively reduce a velocity command directed to lift valve arrangement 54 and/or to increase a velocity command directed to tilt valve arrangement 56 during flow-limited negative parallel lift. The reduction in the velocity command directed to lift valve arrangement 54 may result in an availability of some flow for use by tilt valve arrangement 56, while the effects of gravity on lift speed may make up for the reduction in lift flow. Accordingly, the reduction may be in an amount related to an amount required by tilt valve arrangement 56 to maintain work tool 14 at the desired tilt angle. The increased velocity command directed to tilt valve arrangement 56, in conjunction with the flow distribution functionality of pressure compensating valves 78, may result in some flow originally intended for lift valve arrangement 54 being diverted to tilt valve arrangement 56.

Controller 58 may terminate parallel lift operations based on various input. For example, controller 58 may terminate parallel lift based on operator input received via mode button 99 (e.g., when mode button 99 is manipulated by the operator during parallel lift). In another example, parallel lift may be terminated when an operator requests via interface device 98 a desired lift velocity that is about zero (i.e., when the operator stops manipulating interface device 98) or requests a desired tilt velocity. In yet another example, controller 58 may terminate parallel lift as the tilt angle of work tool 14 deviates from the range of angles specified for use during parallel lift (e.g., when surface 112 work tool 14 nears or exceeds about +/−30° relative to plane 114), as provided by way of sensor 102. In a final example, controller 58 may terminate parallel lift when parallel lift is no longer physically possible to implement, such as when one of cylinders 20, 26 nears or reaches an end-of-stroke position or another physical limit is attained. Other input causing termination of parallel lift may also be possible.

Controller 58 may terminate parallel lift operations in a gradual manner. Specifically, when mode button 99 is depressed during parallel lift, when the desired lift velocity goes to about zero (i.e., when the operator stops manipulating interface device 98), when a desired tilt velocity is received from the operator, when the tilt angle nears or exceeds about +/−30°, and/or when one of cylinders 20, 26 nears or reaches an end-of-stroke position, controller 58 may gradually decrease the automatic control of tilt velocity to thereby gradually transition the tilting movement of work tool 14 to either a zero titling velocity (in the examples of mode button 99 being pressed or the specified range of angles being exceeded) or an operator controlled tilt velocity (in the examples of the operator requesting a tilt velocity), and avoid abrupt tilt velocity changes that could result in material within work tool 14 being shifted or spilled. For example, when an operator manipulates operator interface device 98 to command a desired tilt velocity, controller 58 may immediately stop commanding tilt valve arrangement 56 based on the feedback from sensors 102, 103. In addition, as the desired tilt velocity increases, the feedforward control term utilized by controller 58 may be reduced until the velocity command directed to tilt valve arrangement 56 is entirely dependent on operator input. In one example, controller 58 may not begin reducing the feedforward control term until the tilt velocity signal from interface device 98 indicates a desired velocity at least a threshold amount, for example about 50% of a maximum velocity. It is contemplated that the phasing out of the feedforward control term may be implemented in a linear or curvilinear manner, as desired, and based on equations and/or maps stored within the memory of controller 58.

In the example that utilizes the specified range of angles for parallel lift operation and/or in the example where one of hydraulic cylinders 20, 26 reaches its end-of-stroke position, feedback control may be made inactive and feedforward control gradually phased to about zero as endpoints of the specified range and/or end-of-stroke position are neared. Similarly, when a fault condition is detected by controller 58, feedback control may be immediately eliminated and both the lifting and tilting movements gradually reduced to about zero over a set period of time to reduce tool movement instabilities. During this time-based gradual reduction of lift and tilt velocities, the tilt velocity may still be determined as a scaled ratio of the reducing lift velocity such that the parallel movement of work tool 14 may be maintained.

In some situations, the desired work tool tilt angle utilized for parallel lift may change when parallel lift is prematurely terminated. Specifically, at the time of termination, it may be possible that the actual tilt angle does not equal the original operator-desired tilt angle. In this situation, when parallel lift has been terminated, the current tilt angle may become the desired tilt angle used in subsequent operations when parallel lift is again implemented.

The disclosed hydraulic control system 48 may provide for a responsive and accurate way to maintain a desired work tool angle during a lifting operation. In particular, because a desired lift velocity may be scaled down to produce a tilt velocity that should maintain the desired orientation, hydraulic control system 48 may be proactive and not need to first experience an undesired orientation before changing adjusting the orientation of work tool 14. This functionality may help to improve accuracy in the orientation of work tool 14, as well as responsiveness. In fact, because the hydraulic control system 48 may have the ability to adjust the scale factor used during the scaling, accuracy in the orientation may be enhanced even further over time.

It will be apparent to those skilled in the art that various modifications and variations can be made to the disclosed hydraulic system. Other embodiments will be apparent to those skilled in the art from consideration of the specification and practice of the disclosed hydraulic system. For example, although Steps 300-370 are shown and described as occurring in a particular order, it is contemplated that the order of the steps may be modified, if desired. It is intended that the specification and examples be considered as exemplary only, with a true scope being indicated by the following claims and their equivalents.

What is claimed is:

1. A hydraulic system, comprising:

a pump configured to pressurize fluid;

a lift actuator;

a lift valve arrangement configured to meter pressurized fluid from the pump into the lift actuator to lift a work tool;

a lift sensor associated with the lift actuator and configured to generate a first signal indicative of an actual lift velocity of the work tool;

a tilt actuator;

a tilt valve arrangement configured to meter pressurized fluid from the pump into the tilt actuator to tilt the work tool;

at least one operator interface device movable by an operator to generate a second signal indicative of a desired lift velocity of the work tool, and a third signal indicative of desired tilt velocity of the work tool; and a controller in communication with the lift valve arrangement, the lift sensor, the tilt valve arrangement, and the at least one operator interface device, the controller being configured to:

command the lift valve arrangement to meter pressurized fluid into the lift actuator based on the second signal;

command the tilt valve arrangement to meter pressurized fluid into the tilt actuator based on the third signal; and command the tilt valve arrangement to meter pressurized fluid into the tilt actuator and maintain a desired tilt angle of the work tool during lifting based selectively on the first and second signals.

2. The hydraulic system of claim 1, wherein the controller is configured to determine a tilt command that results in the work tool being maintained at the desired tilt angle during lifting, by scaling one of the actual lift velocity and the desired lift velocity.

3. The hydraulic system of claim 2, wherein the tilt command is determined by scaling a greater of the actual and desired lift velocities.

4. The hydraulic system of claim 2, wherein the controller is configured to use a first scaling factor to determine the tilt command when the work tool is tilting in a first direction, and to use a second scaling factor different from the first scaling factor to determine the tilt command when the work tool is tilting in a second direction opposite the first direction.

5. The hydraulic system of claim 2, wherein:

the work tool is tiltable in a racking direction away from a ground surface and a dumping direction toward the ground surface; and the controller is configured to offset the tilt command an amount in the racking direction that is related to an amount of lifting implemented since capture of the desired tilt angle.

6. The hydraulic system of claim 2, wherein, the controller is configured to:

direct a full value of the tilt command to the tilt valve arrangement during work tool lifting only when the third signal is indicative of a desired tilt velocity less than a threshold amount; and phase out the tilt command as an absolute value of the third signal indicates the desired tilt velocity increasing past the threshold amount.

7. The hydraulic system of claim 1, wherein the controller is configured to command the tilt valve arrangement to meter pressurized fluid into the tilt actuator and maintain the desired tilt angle during lifting based on only the second signal when the second signal indicates a desired lift velocity of about zero.

8. The hydraulic system of claim 1, wherein the controller is configured to command the tilt valve arrangement to meter pressurized fluid into the tilt actuator based selectively on the first and second signals depending on a lift direction of the work tool.

9. The hydraulic system of claim 8, wherein the controller is configured to command the tilt valve arrangement to meter pressurized fluid into the tilt actuator and maintain the desired tilt angle during lifting based on only the second signal when the lift direction is against the force of gravity and the work tool is capable of moving.

10. The hydraulic system of claim 8, wherein the controller is configured to command the tilt valve arrangement to meter pressurized fluid into the tilt actuator and maintain the desired tilt angle during lifting based on only the first signal when the lift direction is with the force of gravity.

11. The hydraulic system of claim 1, wherein, as the lift actuator nears an end-of-stroke position, the controller is further configured to reduce a portion of a command directed to the tilt valve arrangement that is based on the first signal.

12. The hydraulic system of claim 1, wherein, as an output of the pump nears a maximum operating pressure, the controller is further configured to reduce a portion of a command directed to the tilt valve arrangement that is based on the second signal.

13. The hydraulic system of claim 1, wherein the controller is further configured to:

determine that tilting of the work tool must switch directions at a particular point during lifting in order to maintain the desired tilt angle; and command the tilt valve arrangement to stop metering pressurized fluid based on proximity to the particular point.

14. The hydraulic system of claim 1, further including a tilt sensor configured to generate a fourth signal indicative of an actual tilt angle of the work tool during control of the tilt valve arrangement based on the first or second signals, wherein the controller is further configured to adjust command of the tilt valve arrangement based on the fourth signal.

15. The hydraulic system of claim 1, wherein, when the hydraulic system is flow-limited during work tool lifting in a direction with the force of gravity, the controller is configured to limit pump flow to the lift actuator by an amount related to an amount required by the tilt actuator to maintain the work tool at the desired tilt angle.

16. The hydraulic system of claim 1, wherein, when the hydraulic system is flow-limited during work tool lifting in a direction with the force of gravity, the controller is configured to command increased flow to the tilt actuator above an amount determined to be required by the tilt actuator to maintain the work tool at the desired tilt angle based on the first or second signals.

17. The hydraulic system of claim 1, wherein, during command of the tilt valve arrangement based on the first or second signals, when the second signal indicates a desired lift velocity of about zero, a current tilt angle becomes the desired tilt angle for subsequent control.

18. The hydraulic system of claim 1, wherein, during command of the tilt valve arrangement based on the first or second signals, when the third signal is received, a tilt angle of the work tool resulting from control based on the third signal becomes the desired tilt angle for subsequent control based on the first or second signals when the third signal indicates a desired tilt velocity of about zero.

19. A hydraulic system, comprising:

a pump configured to pressurize fluid;

a lift actuator;

a lift valve arrangement configured to meter pressurized fluid from the pump into the lift actuator to lift a work tool;

a lift sensor associated with the lift actuator and configured to generate a first signal indicative of an actual lift velocity of the work tool;

a tilt actuator;

a tilt valve arrangement configured to meter pressurized fluid from the pump into the tilt actuator to tilt the work tool;

a tilt sensor configured to generate a second signal indicative of an actual tilt angle of the work tool;

at least one operator interface device movable by an operator to generate a third signal indicative of a desired lift velocity of the work tool, and a fourth signal indicative of desired tilt velocity of the work tool; and a controller in communication with the lift valve arrangement, the lift sensor, the tilt valve arrangement, the tilt sensor, and the at least one operator interface device, the controller being configured to:

command the lift valve arrangement to meter pressurized fluid into the lift actuator based on the third signal;

command the tilt valve arrangement to meter pressurized fluid into the tilt actuator based on the fourth signal;

scale a greater of the actual and the desired lift velocities associated with the first and third signals to determine a scaled tilt velocity required to maintain the work tool at a desired tilt angle during lifting;

selectively command the tilt valve arrangement to meter pressurized fluid at a rate corresponding to the scaled tilt velocity; and adjust the scaled tilt velocity based on the second signal.

20. A method of operating a machine, comprising:

receiving operator input indicative of a desired lift velocity of a work tool and a desired tilt velocity of the work tool;

pressurizing fluid;

metering pressurized fluid into a lift actuator based on the desired lift velocity;

sensing an actual lift velocity of the work tool;

metering pressurized fluid into a tilt actuator based on the desired tilt velocity; and metering pressurized fluid into the tilt actuator to maintain a desired tilt angle of the work tool during lifting based selectively on the desired lift velocity and the actual lift velocity of the work tool.

21. The method of claim 20, further including determining a tilt command that results in the work tool being maintained at the desired tilt angle during lifting, by scaling one of the actual lift velocity and the desired lift velocity.

22. The method of claim 21, wherein the tilt command is determined by scaling the greater of the desired and actual lift velocities.

23. The method of claim 21, wherein scaling includes scaling using a first scaling factor when the work tool is tilting in a first direction, and scaling using a second scaling factor different from the first scaling factor when the work tool is tilting in a second direction opposite the first direction.

24. The method of claim 21, further including offsetting the tilt command an amount in a racking direction that is related to an amount of lifting implemented since capture of the desired tilt angle.

25. The method of claim 21, further including:

using a full value of the tilt command to meter pressurized fluid into the tilt actuator during work tool lifting only when the desired tilt velocity less than a threshold amount; and phasing out use of the tilt command the desired tilt velocity increases past the threshold amount.

26. The method of claim 20, wherein metering pressurized fluid into the tilt actuator to maintain the desired tilt angle during lifting includes metering pressurized fluid into the tilt actuator based on only the desired lift velocity when the desired lift velocity is about zero.

27. The method of claim 20, wherein metering pressurized fluid into the tilt actuator to maintain a desired tilt angle of the work tool during lifting includes metering pressurized fluid into the tilt actuator based selectively on the desired and actual lift velocities depending on a lift direction of the work tool.

28. The method of claim 27, wherein metering pressurized fluid into the tilt actuator to maintain a desired tilt angle of the work tool during lifting includes metering pressurized fluid into the tilt actuator based on only the desired lift velocity when the lift direction is against the force of gravity and the work tool is lifting.

29. The method of claim 27, wherein metering pressurized fluid into the tilt actuator to maintain a desired tilt angle of the work tool during lifting includes metering pressurized fluid into the tilt actuator based on only the actual lift velocity when the lift direction is with the force of gravity.

30. The method of claim 20, wherein, as the lift actuator nears an end-of-stroke position, the method further includes reducing the metering of pressurized fluid into the tilt actuator that is based on the actual lift velocity.

31. The method of claim 20, wherein, as a system pressure nears a maximum operating pressure, the method further includes reducing the metering of pressurized fluid into the tilt actuator that is based on the desired lift velocity.

32. The method of claim 20, wherein the method further includes:

determining that tilting of the work tool must switch directions at a particular point during lifting in order to maintain the desired tilt angle; and stopping the metering of fluid into the tilt actuator based proximity to the particular point.

33. The method of claim 20, further including sensing an actual tilt angle of the work tool during metering based on the actual and desired lift velocities, and adjusting the metering based on the actual tilt angle.

34. The method of claim 20, wherein, when the machine is flow-limited during work tool lifting in a direction with the force of gravity, the method further includes limiting the metering of pressurized fluid into the lift actuator by an amount related to an amount required by the tilt actuator to maintain the work tool at the desired tilt angle.

35. The method of claim 20, wherein, when the machine is flow-limited during work tool lifting in a direction with the force of gravity, the method further includes commanding increased metering of pressurized fluid into the tilt actuator above an amount determined to be required by the tilt actuator to maintain the work tool at the desired tilt angle based on the actual or desired lift velocities.

36. The method of claim 20, wherein, during the metering of pressurized fluid into the tilt actuator based selectively on the desired and actual lift velocities, when the operator input indicates a desired lift velocity about zero, the method further includes setting a current tilt angle of the work tool as the desired tilt angle for subsequent control.

37. The method of claim 20, wherein, during the selective metering of pressurized fluid into the tilt actuator based on the desired and actual lift velocities, when the operator input indicative of the desired tilt velocity is received, a work tool angle resulting from control based on the desired tilt velocity becomes the desired tilt angle for subsequent control based on the desired and actual lift velocities when the desired tilt velocity becomes about zero.

* * * * *